(12) United States Patent
Rainville et al.

(10) Patent No.: US 8,057,929 B2
(45) Date of Patent: Nov. 15, 2011

(54) REGENERATIVE COMPRESSOR MOTOR CONTROL FOR A FUEL CELL POWER SYSTEM

(75) Inventors: Joseph D Rainville, Caledonia, NY (US); John R Bonkoske, Lockport, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1629 days.

(21) Appl. No.: 10/689,198

(22) Filed: Oct. 20, 2003

(65) Prior Publication Data

US 2005/0084724 A1 Apr. 21, 2005

(51) Int. Cl.
*H01M 8/02* (2006.01)
*H01M 8/04* (2006.01)

(52) U.S. Cl. .......... 429/12; 429/430; 429/443; 429/444; 429/512

(58) Field of Classification Search .............. None
See application file for complete search history.

(56) References Cited

U.S. PATENT DOCUMENTS

| 5,434,016 | A | * | 7/1995 | Benz et al. | 429/432 |
| 5,501,083 | A | * | 3/1996 | Kim | 62/228.4 |
| 5,645,950 | A | * | 7/1997 | Benz et al. | 429/429 |
| 5,780,980 | A | * | 7/1998 | Naito | 318/139 |
| 6,034,445 | A | * | 3/2000 | Hewitt | 307/80 |
| 6,488,345 | B1 | | 12/2002 | Woody et al. | |
| 6,616,424 | B2 | * | 9/2003 | Raiser | 417/411 |
| 6,647,724 | B1 | * | 11/2003 | Arnold et al. | 60/608 |
| 2001/0051291 | A1 | * | 12/2001 | Aoyagi et al. | 429/23 |
| 2002/0064695 | A1 | * | 5/2002 | Raiser | 429/13 |
| 2002/0172847 | A1 | * | 11/2002 | Aoyagi et al. | 429/24 |
| 2003/0068538 | A1 | * | 4/2003 | Lahiff | 429/13 |
| 2003/0077494 | A1 | * | 4/2003 | Aberle et al. | 429/23 |

* cited by examiner

*Primary Examiner* — Ula C. Ruddock
*Assistant Examiner* — Alix Echelmeyer
(74) *Attorney, Agent, or Firm* — Harness, Dickey & Pierce, P.L.C.

(57) ABSTRACT

A variable capacity compressor that is operable in a normal mode and either an upward or downward rapid transient mode includes a compressor that compresses a fluid and a motor that drives the compressor. A controller powers the motor from a main power source when operating in the normal mode and powers the motor from a supplemental power source when operating in the upward rapid transient mode.

9 Claims, 2 Drawing Sheets

US 8,057,929 B2

REGENERATIVE COMPRESSOR MOTOR CONTROL FOR A FUEL CELL POWER SYSTEM

FIELD OF THE INVENTION

The present invention relates to fuel cell systems, and more particularly to operating a compressor of a fuel cell system.

BACKGROUND OF THE INVENTION

Fuel cell systems include a fuel cell stack that produces electrical energy based on a reaction between a hydrogen-based feed gas (e.g., pure hydrogen or a hydrogen reformate) and an oxidant feed gas (e.g., pure oxygen or oxygen-containing air). The hydrogen-based feed gas and oxidant feed gas are supplied to the fuel cell stack at appropriate operating conditions (i.e., temperature and pressure) for reacting therein. The proper conditioning of the feed gases is achieved by other components of the fuel cell stack to provide the proper operating conditions.

The fuel cell system includes a compressor for compressing and pumping the oxidant feed gas to an appropriate operating pressure for reaction in the fuel cell stack. The compressor is required to respond to load change requests. For example, when a higher power output from the fuel cell is required (e.g., during a vehicle acceleration event), the compressor must increase capacity to provide the oxidant to the fuel cell at a quicker rate.

The upward transient response time is required to be a change from 10% to 90% capacity in approximately 1 second. Such rapid response times can cause short-term power drain several times the power rating of the compressor motor. Further, power is wasted when current is used to brake the motor during a downward transient (e.g., 90% to 10% capacity).

SUMMARY OF THE INVENTION

Accordingly, the present invention provides a variable capacity compressor system that is operable in a normal mode and a rapid transient mode. The variable capacity compressor system includes a compressor such as an impeller or rotor set that compresses a fluid and a motor that drives the compressor. A controller powers the motor from a main power source when operating in the normal mode and powers the motor from a supplemental power source when operating in the rapid transient mode.

In one feature, the controller operates the motor to maintain a first capacity when in the normal mode.

In another feature, the controller operates the motor to transfer from a first capacity to a second capacity when in the rapid transient mode.

In another feature, the supplemental power source is a capacitor.

In another feature, the controller implements charging of the supplemental power source during the normal mode.

In still another feature, said controller implements the use of power from the supplemental power source to increase motor speed when in the rapid transient mode.

In yet another feature, the controller causes regenerative braking of the motor to convert mechanical energy into power to produce charging current.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention. Compressor as used in this specification includes machines including, but not limited to, the following types: compressor, twin-screw compressor, roots blower, blower, centrifugal or radial compressor, axial compressor and positive displacement compressor.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
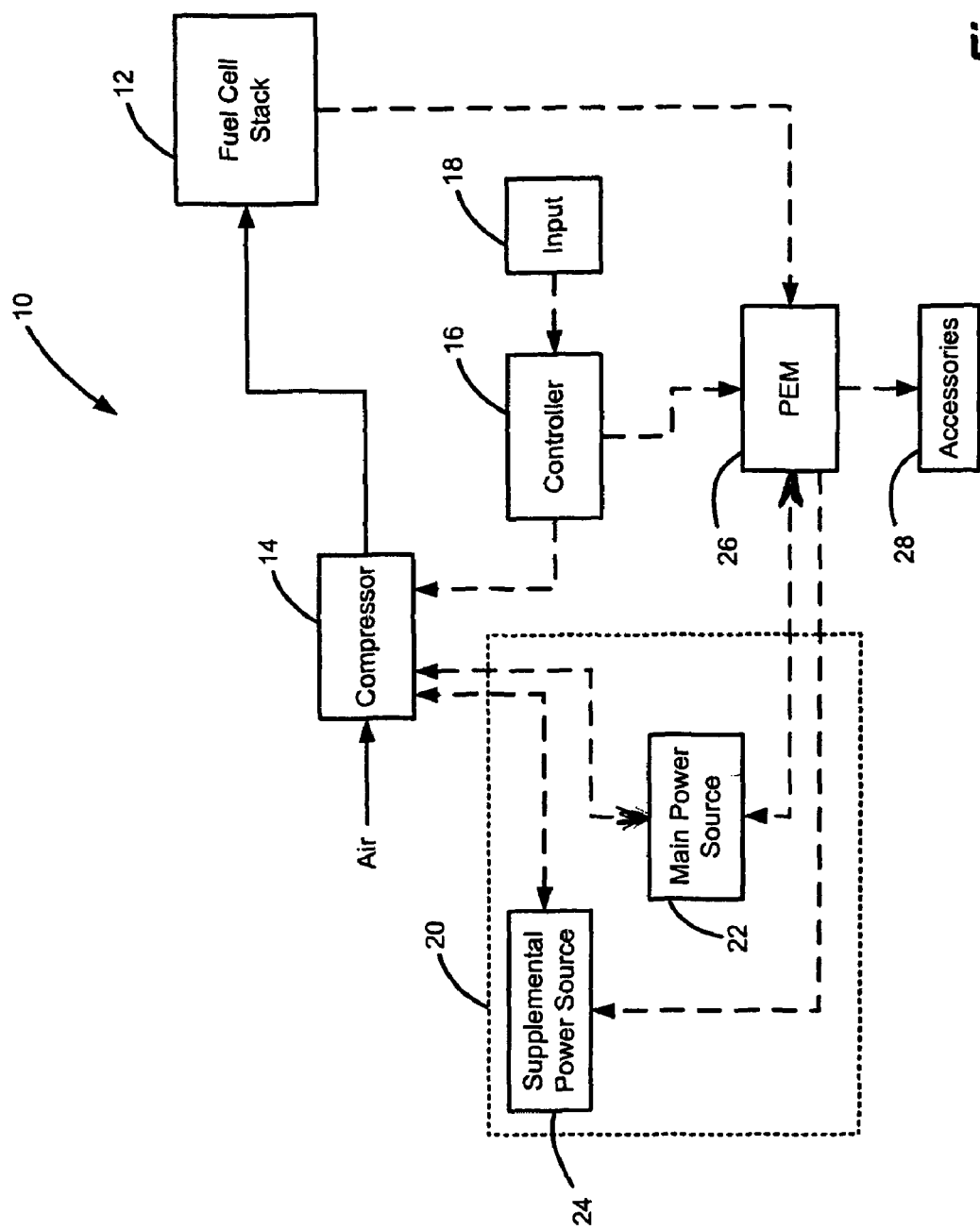
FIG. 1 is a schematic illustration of a fuel cell system including a variable capacity compressor according to the present invention.

Referring now to FIG. 1, a fuel cell system 10 is shown. The fuel cell system 10 includes a fuel cell stack 12 and a compressor 14. The compressor 14 supplies the fuel cell stack 12 with a gaseous oxidant for processing in the fuel cell stack 12. The gaseous oxidant is generally provided as air, however, it is anticipated that other oxidants including, but not limited to, pure oxygen can be implemented. The fuel cell stack 12 processes the oxidant and hydrogen to produce electrical power. The hydrogen is supplied to the fuel cell stack 12 through a hydrogen supply system (not shown).

The fuel cell system 10 further includes a controller 16 that controls operation of the fuel cell system 10. An input 18 generates a desired power signal to the controller 16. The controller 16 generates a compressor control signal based on the desired power signal. The compressor 14 operates at a capacity as dictated by the control signal. The compressor 14 is operable in a normal mode and either upward or downward rapid transient modes. While operating in the normal mode, the compressor capacity remains relatively constant or with capacity changes below a corresponding upward or downward threshold rate. While operating in the upward rapid transient mode, the compressor capacity rapidly changes above the upward threshold rate. While operating in the downward rapid transient mode, the compressor capacity rapidly changes relative to the downward threshold rate.

Exemplary rapid capacity transients include an upward transient from 10% to 90% capacity change in approximately 1 second (i.e., 80%/s rate) or a downward transient from 90% to 10% capacity in approximately 1 second. In general, a rapid transient can be defined as being greater than the threshold rate. An exemplary threshold rate includes a transient of at least 40%/s upward or downward. A range that is considered "rapid" transient, requiring implementation of the supplemental power source is on the order of 40%/sec. (forty percent per second). Such rapid upward transients can result in the compressor motor drawing 2 to 3 times its rated power. In the case of an exemplary 14 kW compressor, such rapid upward transients can result in the compressor drawing 28 kW-42 kW.

The compressor 14 is powered by a power system 20. The power system 20 includes a main power source 22 and a supplemental power source 24. The main power source 22 is preferably provided as a battery including, but not limited to, lead-acid (PbA), nickel-metal hydride (NiMH), lithium-ion (Li) or any one of several battery types known in the art.

The supplemental power source 24 preferably includes an energy storage device having rapid discharge and charging characteristics. Such energy storage devices include capacitors or super-capacitors. Capacitors and super-capacitors are energy storage devices that include both battery and traditional capacitor characteristics. Both can be charged and discharged quickly, however, the super-capacitor exhibits significantly enhanced capacitance over traditional capacitors. As a result, the super-capacitor can supply more power for powering the compressor 14 during rapid upward transients. The rapid discharge characteristic of energy storage devices such as capacitors and super-capacitors provide the rapid, high energy demand of the compressor 14 during rapid upward transients.

In accordance with the present invention and as explained in further detail below, the compressor 14 is powered by the main power source 22 during normal operation and the supplemental power source 24 during rapid upward transient operation. The fuel cell stack 12 charges both the main power source 22 and the supplemental power source 24 through a power electronics module (PEM) 26. The PEM 26 manages power distribution from the fuel cell stack 12 for charging and powering vehicle accessories 28 including a stereo, lights, powered mirrors, doors, locks and the like. During rapid downward transients, however, the compressor motor is regeneratively braked to produce charging current. The charging current is preferably used to charge either the main or supplementary power sources 22,24. Although not preferred, it is within the scope of the invention to charge both the main and supplementary power sources 22, 24 simultaneously. In addition, the main power source 22 is useable to power accessories 28.

Figure 2:
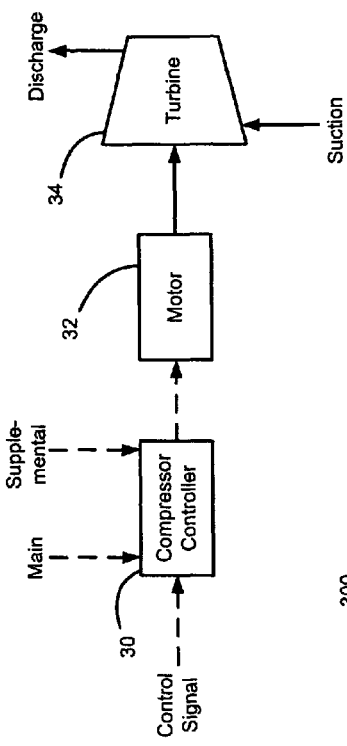
FIG. 2 is a schematic illustration of the variable capacity compressor.

Referring now to FIG. 2, the compressor 14 includes a compressor controller 30, a motor 32 and a compressor unit 34. The compressor 34 draws an oxygen-rich feed gas in through a suction and discharges the compressed feed gas through a discharge to the fuel cell stack 12. The compressor controller 30 receives the control signal from the controller 16 and operates the compressor 14 based thereon. Although separate system and compressor controllers 16,30 are illustrated, it is anticipated that a single controller can control operation of the fuel cell system 10 including the compressor 14.

The compressor controller 30 determines whether the compressor 14 is to be operated in the normal mode or one of the rapid transient modes based on the control signal. For example, if the control signal indicates that the compressor capacity is to remain constant or change capacity at a slow transient, the compressor 14 is to be operated in the normal mode. If the control signal indicates that the compressor capacity is to change at a rapid transient, the compressor 14 is to be operated in the corresponding rapid upward or downward transient mode. The compressor controller 30 determines to draw power from the main power source 22 during operation in the normal mode and draws power from the supplemental power source 24 during operation in the rapid upward transient mode. Although not preferred, it is within the scope of the invention to draw power from both the main and supplemental power sources 22, 24 during an upward rapid transient.

Figure 3:
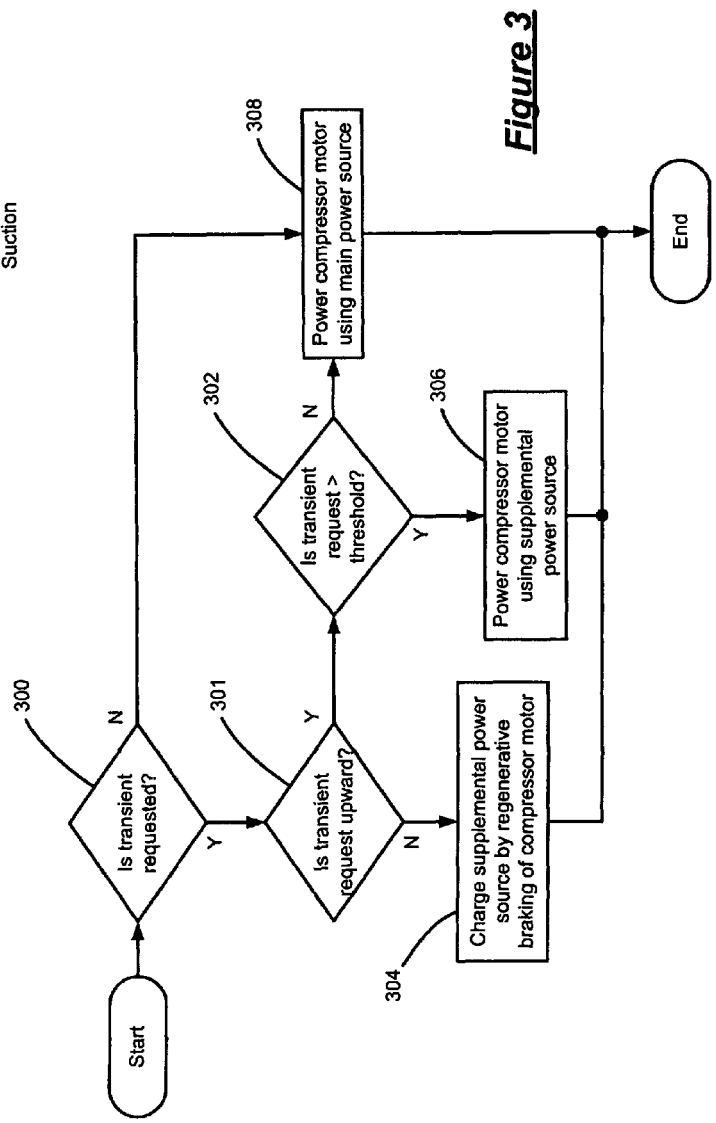
FIG. 3 is a flowchart illustrating a compressor control according to the present invention.

Referring now to FIG. 3, the compressor control of the present invention will be described in detail. In step 300, control determines if a transient is requested. In step 301, control determines whether the transient is upward. If the transient is upward, control continues in step 302. If the transient is downward, control regeneratively brakes the compressor motor 32 to produce charging current to charge either the main or supplemental power sources 22,24 in step 304 and control ends. In step 302, control determines whether the transient request is greater than the threshold. If the transient request is greater than the threshold, control operates the fuel cell system 10 in the rapid transient mode, powering the compressor motor 32 using the supplemental power source 24 in step 306 and control ends. If the transient request is not greater than the threshold, control operates the fuel cell system 10 in the normal mode, powering the compressor motor 32 using the main power source 22 in step 308 and control ends.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A fuel cell system, comprising:
a fuel cell that processes an oxidant to produce electrical energy;
a variable capacity compressor system that supplies said oxidant to said fuel cell and that during operation of the fuel cell system, supplies said oxidant by operating in a mode selected from a normal mode below a threshold rate of 40%/s change in capacity and a rapid transient mode selected from an upward and downward variation at or above the threshold rate, said variable capacity compressor system comprising:
a compressor that compresses said oxidant; and
a compressor motor that drives said compressor
a controller that monitors a power demand from said fuel cell and that selects a power source for said compressor motor, said power source being either a main power source when operating in said normal mode or a supplemental power source when operating in said rapid transient mode which is upward wherein said supplemental power source is selected from capacitors and supercapacitors and wherein said controller controls charging of said supplemental power source comprising regenerative braking of the compressor motor that converts mechanical energy into charging current.

2. The fuel cell system of claim 1 wherein charging further comprises using power generated by said fuel cell.

3. The fuel cell system of claim 1 wherein said controller shifts said variable capacity compressor between said normal mode and said rapid transient mode based on said power demand.

4. A method of operating a fuel cell system comprising a variable capacity compressor system, comprising a variable capacity compressor that supplies an oxidant to fuel cells of the fuel cell system while the fuel cell system operates and a compressor motor that drives the compressor, the method comprising:
operating said variable capacity compressor in a normal mode at a first capacity of the fuel cell system to produce electrical power;
powering the compressor motor from a main power source during said normal mode;
adjusting said variable capacity compressor from said first capacity to a second capacity of the fuel cell system to produce electrical power when in a rapid transient mode at or above a threshold rate of 40%/s change in capacity; and when in said rapid transient mode either:
- a) powering the compressor motor from a supplemental power source when said rapid transient mode is an upward rapid transient mode, or
- b) regeneratively braking the compressor motor to produce charging current for said supplemental power source when operating in said rapid transient mode which is a downward rapid transient mode.

5. The method of claim 4 wherein said second capacity is greater than said first capacity when operating in said upward rapid transient mode.

6. The method of claim 4 wherein said second capacity is less than said first capacity wherein operating in said downward rapid transient mode.

7. The method of claim 4 wherein said supplemental power source is a capacitor.

8. The method of claim 4 further comprising charging said supplemental power source during said normal mode.

9. The method of claim 4 further comprising using power from said supplemental power source to increase speed of the compressor motor when in said upward rapid transient mode.

* * * * *